Figure 1:
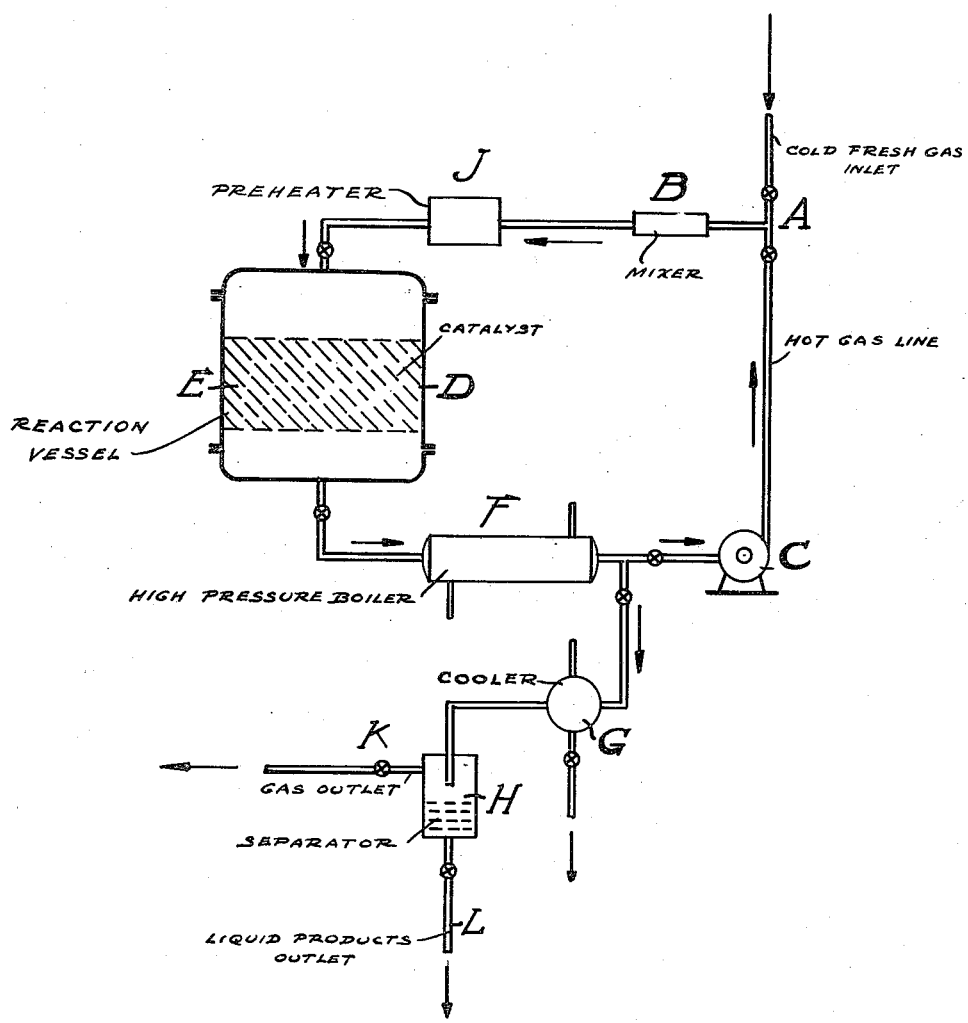

Patented Apr. 7, 1942

2,279,052

UNITED STATES PATENT OFFICE 2,279,052

PRODUCTION OF HYDROCARBONS

Wilhelm Michael and Ernst Plauth, Ludwigshafen-on-the-Rhine, Germany, assignors to Standard Catalytic Company, a corporation of Delaware Application June 6, 1939, Serial No. 277,630
In Germany June 7, 1938

15 Claims. (Cl. 260—449)

This invention relates to improvements in the production of hydrocarbons with more than one carbon atom in the molecule, contingently together with minor amounts of liquid or solid oxygen-containing derivatives thereof by conversion of carbon monoxide with hydrogen. Prior to the present invention the regulation of the temperature in this reaction could only be attained by complicated measures, while in the production of hydrocarbons of the nature of benzine products satisfactory as regards their knocking properties could not be obtained in a simple manner.

In the said conversion large amounts of heat are evolved and the withdrawal thereof, necessary for maintaining the desired reaction temperature, often causes difficulties. On the other hand, it is necessary to keep the reaction temperature within definite limits in order to prevent side-reactions or an undesired change of the product, such as the formation of methane and the deposition of soot on the catalyst. Withdrawal of heat through the wall of the vessel is sometimes insufficient or is complicated whereas, when employing large reaction vessels, a uniform distribution of the temperature could hitherto only be obtained by expensive and complicated construction of the apparatus.

In the industrial development of the conversion of carbon monoxide with hydrogen the reaction space has been divided into bundles of narrow tubes which are bathed by a cooling agent; further the surfaces of the reaction space have been enlarged by the construction of ribs to obtain a more rapid removal of the heat. In the reaction space also cooling coils or bundles of cooling pipes have been constructed, usually provided with a large number of ribs or all welded into a large number of sheets in order to increase the cooling surface, or cooling agents have been introduced direct into the reacting gases. These measures, however, require on the one hand expensive and complicated plants and on the other hand great care in watching the course of the reaction.

In the said process it is already known to return to the reaction space unconverted initial gases or diluent gases after the desired products were removed therefrom back to the reaction space.

It has now been found that improvements are obtained in the production of hydrocarbons with more than one carbon atom in the molecule, contingently together with minor amounts of liquid or solid oxygen-containing derivatives thereof by conversion of carbon monoxide with hydrogen by returning to the reaction space gases which have already been subjected to reaction, the volume of the gases returned per unit of time being at least 20 times, preferably at least 50 times, that of the fresh gas introduced in said unit of time.

As a rule it will not be economical to return to the reaction space a volume of gas greater than 500 times the volume of fresh gas introduced, although where desired such larger amounts, for example, 1000 times the volume of fresh gas may be recycled. Preferably the volume of gas returned to the reaction space lies within the limits of between 50 and 200 times that of the fresh gas introduced.

The present method of working allows of an accurate regulation of the temperature in the reaction space. This temperature regulation is carried out by cooling the gases to be returned to the reaction space to adjust the proper temperature at the entrance of the reaction space.

The gases to be returned to the reaction space are preferably cooled to about the temperature prevailing at the entrance of the reaction space, in general to a temperature somewhat above said temperature, since the fresh initial gases can then be introduced in a cold state, whereby the mixture of gas recycled and fresh gas attains the required temperature.

Usually part of the gases leaving the reaction space is branched off and reaction products are separated therefrom. The branching off may be done after the gases issuing from the reaction space are cooled to about the temperature required for temperature regulation.

The part of the gases leaving the reaction space from which the desired products are separated must in continuous operation have the same weight as the fresh gas introduced, in case the unconverted gaseous constituents contained therein are not led back to the reaction space. If the unconverted gaseous constituents are wholly or partly led back, the said part must be larger than the amount of fresh gas introduced, but also in this case the total amount of products withdrawn from the process is equal in weight to the fresh gas introduced.

By this return of the remaining gas the initial gases can be converted to a very large extent into the desired products and it is possible thereby to maintain a lower concentration of reaction products in the cycle. The separation of the desired products from the branched off partial stream need also not be complete in this case.

The remaining gas will not be led back entirely if by-products difficult to separate or impurities originally present in the initial gas are not to be allowed to accumulate too much in the cycle, and a part thereof will be removed in order to keep the concentration of the impurities within desired limits.

The conversion of carbon monoxide with hydrogen into hydrocarbons with more than one carbon atom in the molecule in accordance with the present invention may be carried out at any desired pressure, preferably, at pressures between about 10 and 50 atmospheres. Still higher pressures, such as, for example, 100 or 200 atmospheres or more may, however, also be employed. Also lower pressures or atmospheric pressure come into question. The temperatures are selected within the range of 150° to 450° centigrade, and in general between 170° and 400° centigrade. The composition of the intial fresh gases may vary within wide limits. In general the amount of carbon monoxide may vary between ¼ and 4 times the amount of hydrogen, and preferably the amount of carbon monoxide lies between ½ and twice the amount of hydrogen measured by volume.

As catalysts those known in the art may be employed. The catalyst materials may, if desired, be supported by a carrier such as silica gel or diatomaceous earth. The catalysts may also contain suitable promotors such as alkali metal compounds. Thus iron catalysts may be used, preferably those obtained by decomposition of iron carbonyl, followed by subsequent sintering of the iron flocks or powder obtained thereby, and these are preferred catalysts in accordance with the present invention.

Catalysts obtained by reduction of iron compounds and sintering or fusion of the product may also be employed with advantage. Catalysts containing cobalt and/or nickel or alloys of these are also useful. They may be employed in the form of so-called skeleton catalysts or on carriers such as diatomaceous earth. Activation with thorium oxide and/or magnesium oxide of these catalysts is usually of advantage. Ruthenium catalysts preferably on carriers also give good results.

The increase in temperature permissible in the reaction space is dependent on the specific catalyst employed and is in general at the utmost 50°, and preferably at most 40°, centigrade. With nickel or cobalt catalysts, which are active at about 200° centigrade, the temperature range, which gives the most suitable results, is only relatively small, and therefore the increase in temperature with these catalysts is preferably maintained below 30° centigrade and it is best to maintain the increase in temperature with these catalysts below 10° centigrade, for example, at about 3° or 2° centigrade. With iron catalysts with which the reaction temperature may be above 300° centigrade, in general a somewhat higher increase in temperature is permissible.

Since the reaction velocity increases very rapidly with an increasing temperature, a wide temperature range has the result that in the catalyst layers first coming into contact with the reagents only a small conversion and in the further layers a strong conversion takes place with a large evolution of heat. In these circumstances the reaction conditions become unstable, so that it is preferred to keep the increase in temperature within narrow limits, in order to maintain the temperature at a level which is only little different from the optimum reaction temperature.

According to the present invention, the heat evolved in the reaction is practically completely carried away by the reaction gases themselves. The amount of heat which can be taken up by these gases depends on the specific heat and the amount thereof, and further depends on the increase in temperature allowed in each specific case. In the process according to the present invention the reaction products formed partly remain in the recirculated gas, and therefore participate in the taking up of heat. Since the specific heat of the products formed is larger than that of the initial synthesis gas, the heat capacity of the circulating gas is increased thereby.

The evolution of heat per unit of time depends on various factors, such as the activity of the catalysts, the composition of the gases, in particular on the concentration of the constituents taking part in the reaction and the temperature (since at higher temperatures the reaction velocities increase, so that the heat evolved per unit of time will be higher at higher temperatures under otherwise similar conditions) and therefore the rate of flow of the reaction gases may vary within wide limits.

The rate of flow may be expressed by the duration of sojourn, that is the time that, for example, 1 litre of reaction gas measured under the prevailing temperature and pressure is present in 1 litre of reaction space.

Thus, for example, under a pressure of 10 to 25 atmospheres and in the presence of a catalyst of sintered iron a duration of sojourn of about 1 second is adjusted, if the gas-vapour-mixture introduced into the reaction space consists of 40 per cent by volume of carbon monoxide and hydrogen and of 60 per cent of reaction products (carbon dioxide, hydrocarbons and water vapour). With an initial temperature of about 315° centigrade an increase of about 10° centigrade then occurs. Thereby a volume of gas is circulated, which corresponds to about 100 times the volume of fresh gas introduced. If only a smaller increase in temperature is permissible, fractions of a second are taken as the duration of sojourn and the gas is circulated considerably more rapidly. Thus, for example, with an increase in temperature of 5° centigrade under otherwise the same conditions a volume of gas which is about 200 times the volume of the fresh gas introduced must be recirculated under these circumstances.

In general the duration of sojourn of the reaction gases in each passage through a reaction space controlled by a given cycle is between 0.1 and 5 seconds in the process in accordance with the present invention.

Owing to the thorough mixing produced by the circulation, the temperature of the reacting gases can be kept completely uniform over the total cross-section of the reaction vessel and only in the direction of flow of the gas is an increase in temperature due to the progress of the conversion observed.

When only a small increase in temperature is permissible, a larger amount of gases per unit of time must be recirculated, so that a higher circulation energy is required. When working under increased pressures the required energy is smaller.

In order to keep the circulation energy small, it is in general advantageous to provide relatively shallow catalyst layers, say 1 meter in depth or so, and consequently to spread them over a large area.

The reaction vessel may be subdivided by partitions into chambers, in which the catalyst layers may be arranged. The initial gas may be divided among the various chambers. The reaction products may be separately withdrawn from each chamber and only then combined. It may also be advantageous to combine the hot circulation of the gases with the addition of cool cooling gas to the reaction vessel at a point where the conversion has commenced but where the circulating gases have not yet passed through the whole catalyst, for example, between two catalyst layers. In this case after leaving a catalyst layer the heat formed is taken up by the added gas, for example, by a part of the gases coming from the reaction space, which are cooled to a lower temperature than the hot circulating gas, whereafter the gas stream enters a further catalyst layer. This measure may be repeated many times at will.

The method of temperature regulation of the reaction space with hot circulating gas in accordance with the present invention may, if desired, be carried out in combination with other cooling methods. Thus the gas remaining after the removal of the desired products from the branched off part may be led back at least for a part, as cool cooling gas.

Again the reaction space may, where this does not lead to undesired complication, in part be cooled by indirect contact with temperature regulating fluids, as, for example, water boiling under a suitably regulated pressure.

The reaction space may be subdivided. Thus two or more cycle systems may be connected one behind the other, if desired, with a separation of products therebetween. From the first system so much gas is branched off, that the conversion takes place only to such an extent, that an enrichment of the reaction products or of the impurities only takes place to a limited degree in the first cycle. After separation of the reaction products, the branched off gas enters into the second cycle, in which the conversion is carried to an end. Thereby a higher conversion velocity is obtained in the first cycle.

Where the reaction space has been subdivided and several cycle systems are employed the volume of cycle gas introduced per unit of time by an individual cycle system to the reaction space may be less than 20 times the volume of fresh gas. It is, however, essential in accordance with the present invention that the sum of all volumes of cycle gas returned to the reaction space should be at least 20 times the sum of all volumes of fresh gas introduced in a given unit of time to the reaction space.

The accompanying drawings show plants in which the process described may be carried out with advantage.

In the plant shown in Figure 1 the cold fresh gas is mixed at A with the hot circulating gas coming from the hot circulating blast C. The mixture is passed through a mixing space B and then enters the reaction vessel D, in which it is converted in the catalyst layer E and attains a higher temperature within the limits permissible as a result of the reaction heat evolved. In the high pressure steam boiler F connected behind the reaction space the circulating gas is cooled down so far that it again attains when mixed with the entering fresh gas the temperature desired at the entrance of the vessel. A small partial stream is branched off behind the steam boiler, in order to obtain from it after cooling in cooler G and/or absorption the reaction products by separation in separator H. The preheater placed before the reaction vessel only serves for bringing the initial gas to the reaction temperature at the commencement of the operation; afterwards it is disconnected. The liquid products are withdrawn at L, the remaining gases at K.

Figure 2:
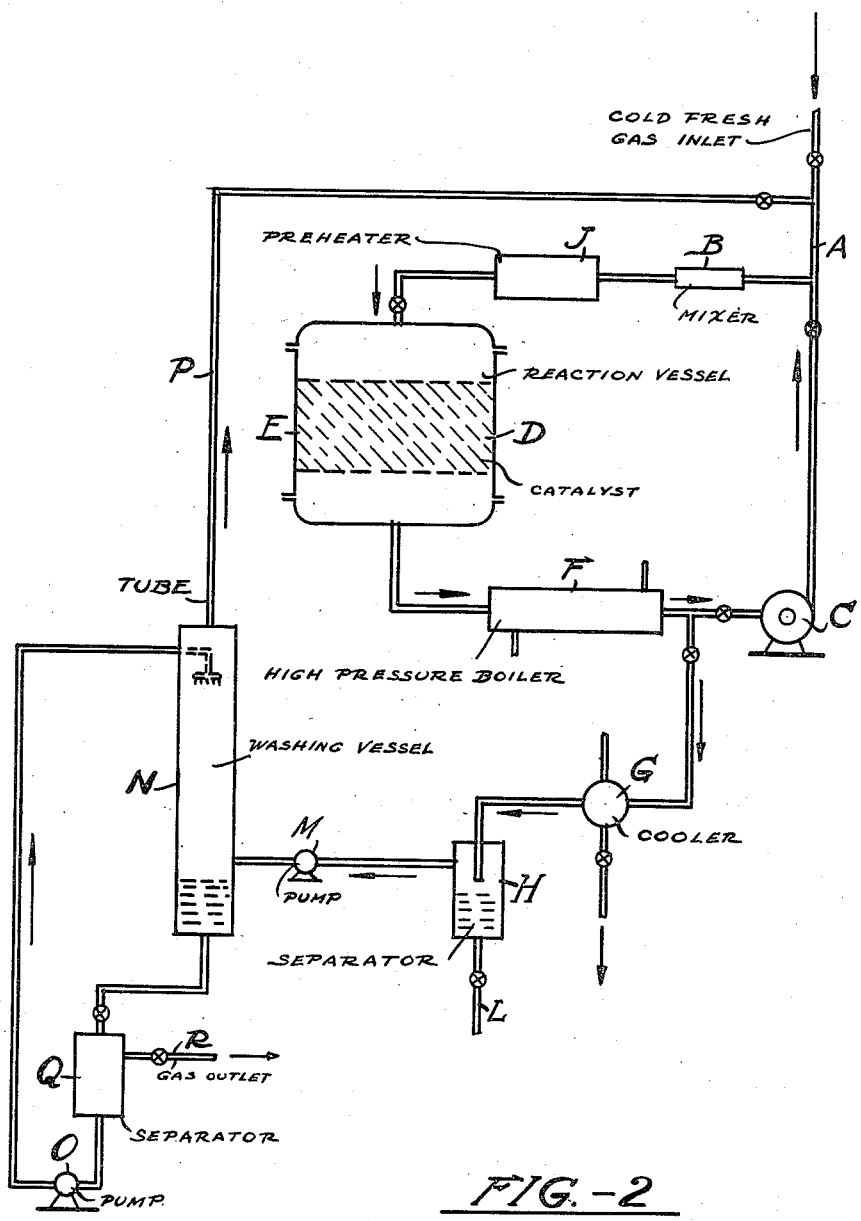

Figure 2 shows a plant, which is similar to that of Figure 1, but in which after separation of the liquid reaction products the branched off partial stream is led back again into the cycle for the purpose of a complete utilization of the initial gases. The gases separated off from the liquid constituents are passed through pump M into the washing vessel N, in which they are treated with a washing liquid introduced at the upper end by pump O. The part of the gases not absorbed by the washing liquid flows through tube P to the point of admission of fresh gas at A. After leaving vessel N the washing liquid is freed from the gases and vapors absorbed in it in the separator Q and thereupon again led into the washing vessel N by means of pump O. The gases and vapors are withdrawn at R.

Figure 3:
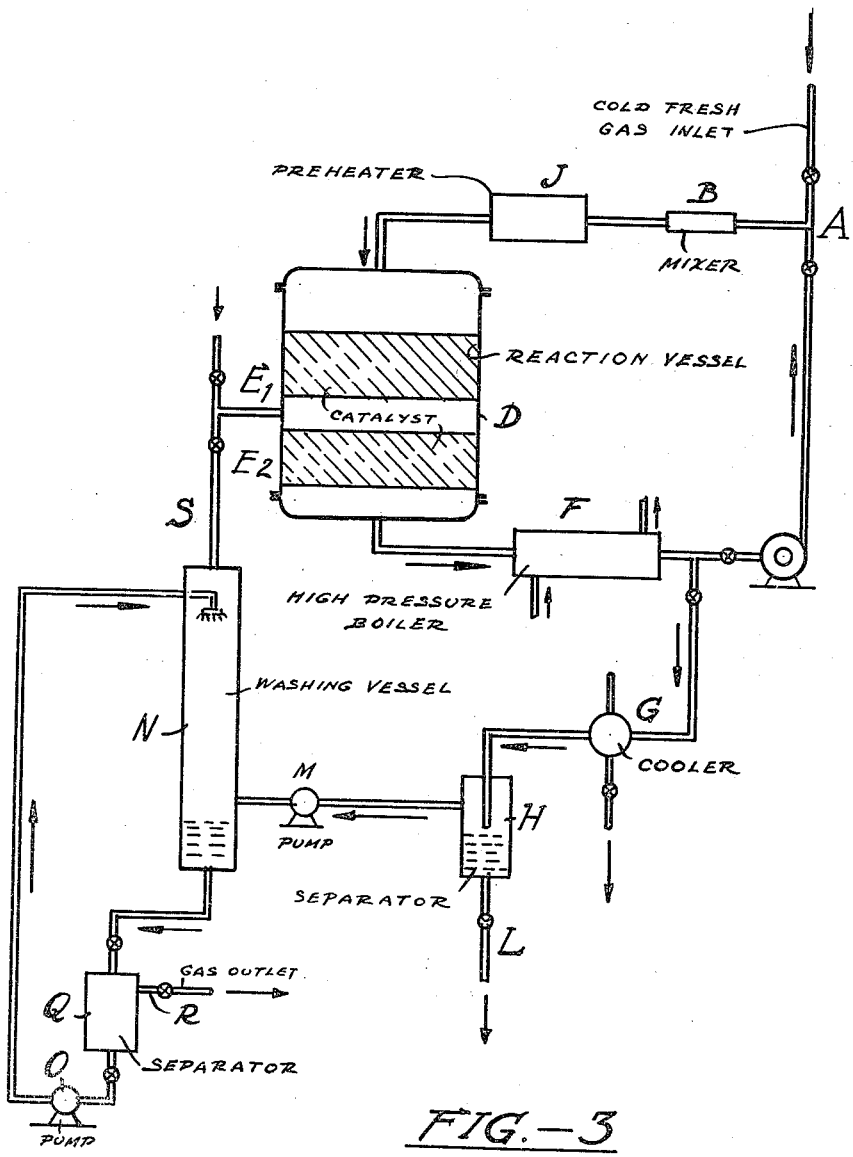

Figure 3 shows a plant for the combination of the process described with cooling by cool gas. A part of the products leaving the vessel is cooled down further than the bulk of the circulating gas and then led into the reaction vessel at one or more places, which lie between two catalyst layers; the reaction mixture after flowing through a catalyst layer is thus again cooled to a suitable temperature and may flow through a further catalyst layer without undesired rises in temperature occurring. In this manner the amount of the hot circulating stream may be considerably reduced. In the plant according to Figure 3 a suitable amount of the gaseous constituents of the partial stream branched off from the hot cycle to be employed as cool cooling gas is introduced from the upper end of the washing vessel N through tube S, after mixing with fresh gas, in the middle of the reaction vessel D.

The present invention makes the employment of large reaction vessels of simple construction possible, containing, for example, one or more layers of catalyst 1 metre in depth and 3 metres in diametre. An advantage of the process is that it allows of the production of a highly knock-proof benzine.

Other products obtained in accordance with the present invention are gaseous olefines, such as propylene and butylene, gas oils and paraffin wax. These may be employed for any purposes known therefore or as initial materials for the manufacture of products of the oil industry or chemical industry. For example, butylene may serve as an initial material for the production of octanes. The gas oils may be employed as diesel fuels or diesel fuel constituents or as initial materials for such conversion, the solid hydrocarbon products may serve as initial materials for oxidation to fatty acids or for the production of lubricating oils.

The following Examples will further illustrate the nature of the said invention and in what manner the same can be carried out in practice, but it should, however, be understood that the invention is not limited to said examples.

*Example 1*

A mixture containing 4 parts of carbon monoxide and 5 parts of hydrogen, obtained in a water gas producer, and in which the content of sulphur has been reduced to less than 5 milligrams per cubic metre, is introduced under a pressure of 20 atmospheres in an amount of 700 cubic metres per hour measured at atmospheric pressure and room temperature into the hot cycle of a synthesis plant as illustrated in Figure 1. The catalyst consisting mainly of sintered iron which has been produced by decomposition of iron carbonyl, is contained in the reaction vessel in a layer 1 metre deep. The cycle gas is circulated so rapidly that 70,000 cubic metres per hour, measured at atmospheric pressure and atmospheric temperature, pass through the reaction space per hour. At the entrance to the reaction space a temperature of 320° C. is maintained and at the outlet a temperature of 330° C. So much heat is taken up from the gases issuing from the reaction vessel in cooler F (a high pressure steam boiler) that after admixture of fresh gas, the cyclic gas returned to the reaction vessel has a temperature of 320° C. An amount of gas equal in weight to the weight of fresh gas introduced to the system is withdrawn from the hot cycle. The products formed are separated from the portion withdrawn by cooling. Per hour are obtained 96 kilograms of solid, liquid and gaseous products of the following composition:

17 kilograms of methane and ethane, 20 kilograms of ethylene and gaseous hydrocarbons, containing 3 and 4 carbon atoms in the molecule which consists mainly of olefine.

42 kilograms of benzine boiling up to 200° C. which is highly knock-proof.

10 kilograms of middle oil (200–400° C.)

1 kilogram of solid paraffin wax.

6 kilograms of alcohols, consisting mainly of ethyl alcohol which are contained in the water formed.

*Example 2*

7000 cubic metres (measured under ordinary pressure) daily of a mixture consisting of 2 parts of carbon monoxide and 3 parts by volume of hydrogen are passed under a pressure of 15 atmospheres through a catalyst space having a volume of 1 cubic metre (filled with an iron catalyst) and are converted therein. The temperature at the inlet is adjusted at 320° C. and during the conversion an increase in temperature of 10° C. is permissible. For this purpose the amount of the circulated gas is taken about 100 times larger than the amount of fresh gas and the cycle gas is cooled almost down to 320° C. by passing through a high pressure steam boiler. A duration of sojourn of the gas measured by volume under the pressure prevailing in the catalyst space of about ¾ second in each passage through the reaction space is required, the calculation of duration of sojourn being based on the supposition that the reaction space is empty. If the catalyst space has, for example, a height of 50 centimeters, a linear velocity of flow of the gas of 65 centimetres per second is necessary for maintaining the said duration of sojourn. The gas pumped back has the following composition:

| | Per cent by volume |
|---|---|
| $CO$ | 5 |
| $H_2$ | 35 |
| $CO_2$ | 27 |
| $H_2O$ vapour | 13 |
| Hydrocarbon gases and vapours | 17 |
| $N_2$ | 3 |

An amount by weight, which is equal to that of the fresh gas introduced, is withdrawn from the circulating gas. In this manner roughly 70 per cent of the fresh gas are converted and daily about 1 ton of liquid, gaseous and solid hydrocarbons besides a small amount of oxygen-containing organic compounds are formed per cubic metre of catalyst space. The composition of the products is similar to that obtained according to Example 1. The energy used for the circulation of the gases amounts to only a fraction of that needed for the compression of the fresh gas.

The amount of product which can be produced by a given amount of catalyst in the unit of time when working with circulating gas is hardly different from that obtainable by treatment of a non-diluted gas mixture under the conditions suitable therefor, though the circulating gas—as shown above—contains only very little carbon monoxide.

What we claim is:

1. A process for the synthesis of hydrocarbons with more than one carbon atom in the molecule and contingently minor amounts of from liquid to solid oxygen-containing derivatives thereof by conversion of carbon monoxide with hydrogen, which comprises returning to the reaction space gases which have already been subjected to the reaction, the volume of the gases returned per unit of time being at least 20 times that of the fresh gas introduced in said unit of time.

2. A process as claimed in claim 1, in which the volume of the gases returned is at least 50 times that of the fresh gas introduced.

3. A process as claimed in claim 1, which comprises returning gases leaving the reaction space after cooling them to adjust the proper temperature at the entrance of the reaction space, the volume of which gases is between 20 and 500 times that of the fresh gas introduced.

4. A process as claimed in claim 1, in which the volume of the gases returned to the reaction space is between 50 and 200 times that of the fresh gas introduced.

5. A process as claimed in claim 1, in which part of the gases leaving the reaction space is branched off and reaction products are separated therefrom.

6. A process as claimed in claim 1, in which the gases issuing from the reaction space are cooled to about the temperature required for temperature regulation, a part of said gases are subsequently branched off and reaction products are separated from said part.

7. In the process claimed in claim 1, cooling the gases to be returned to the reaction space to about the temperature prevailing at the entrance of the reaction space.

8. A process as claimed in claim 1, in which unconverted gaseous constituents remaining after the removal of the reaction products are returned to the reaction space.

9. A process as claimed in claim 1, in which the gaseous constituents remaining after the removal of the reaction products are returned to the reaction space after removal of impurities by washing.

10. In the process as claimed in claim 1, limiting the increase in temperature in the reaction space to at the utmost 50° C.

11. In the process as claimed in claim 1, limiting the increase in temperature in the reaction space to at the utmost 40° C.

12. In the process as claimed in claim 1, limiting the increase in temperature of the reaction gases in the reaction space to at the utmost 2° C.

13. In the process claimed in claim 1 limiting the increase in temperature of the reaction gases in the reaction space to below 10° C. when working with an iron catalyst.

14. In the process claimed in claim 1, limiting the increase in temperature of the reaction gases in the reaction space to below 10° C. when working with an iron catalyst obtained by decomposition of iron carbonyl followed by a sintering of the obtained flocks or powder.

15. In the process as claimed in claim 1, working with a rate of flow of the reaction gases which corresponds to a duration of sojourn between 0.1 and 5 seconds in each passage through the reaction space.

WILHELM MICHAEL.
ERNST PLAUTH.